United States Patent
Ding

(10) Patent No.: US 7,052,542 B2
(45) Date of Patent: May 30, 2006

(54) COMPOSITION FOR CONSTRUCTION MATERIAL AND ITS METHOD OF MAKING AND USING THE SAME

(75) Inventor: Gen Ming Ding, Shanghai (CN)

(73) Assignee: American AS Recycle Technique Co., Ltd., New York, NY (US)

( * ) Notice: Subject to any disclaimer, the term of this patent is extended or adjusted under 35 U.S.C. 154(b) by 180 days.

(21) Appl. No.: 10/121,847

(22) Filed: Apr. 12, 2002

(65) Prior Publication Data
US 2003/0194559 A1    Oct. 16, 2003

(51) Int. Cl.
C04B 12/04    (2006.01)
C04B 12/02    (2006.01)
C04B 35/03    (2006.01)
C04B 35/04    (2006.01)
C04B 34/44    (2006.01)

(52) U.S. Cl. .................. 106/636; 106/690; 106/691; 501/94; 501/108; 501/111; 501/112; 501/121; 501/123; 501/126

(58) Field of Classification Search ............ 106/690, 106/691
See application file for complete search history.

(56) References Cited

U.S. PATENT DOCUMENTS

| | | | |
|---|---|---|---|
| 4,174,227 A * | 11/1979 | Tomic | ............. 106/690 |
| 5,217,655 A | 6/1993 | Schmidt | |
| 5,294,384 A | 3/1994 | David et al. | |
| 5,626,939 A | 5/1997 | Kotlair et al. | |
| 5,662,994 A | 9/1997 | Funger et al. | |
| 5,719,198 A | 2/1998 | Young et al. | |
| 5,724,783 A | 3/1998 | Mandish | |
| 5,786,279 A | 7/1998 | Funger et al. | |
| 5,786,280 A | 7/1998 | Funger et al. | |
| 5,853,634 A | 12/1998 | Ontkean | |
| 5,912,062 A | 6/1999 | Kotliar et al. | |
| 6,212,275 B1 | 4/2001 | Xanthos et al. | |

FOREIGN PATENT DOCUMENTS

DE    4014012    10/1991

OTHER PUBLICATIONS

Derwent Abstract for KR 9405199B Mar. 8, 1991.*

* cited by examiner

Primary Examiner—J. A. Lorengo
Assistant Examiner—Patricia L. Hailey
(74) Attorney, Agent, or Firm—Frommer Lawrence & Haug LLP

(57) ABSTRACT

The present invention relates to a composition for converting fabric into construction material. The present invention also relates to construction material made from fabric and the process of its manufacture.

9 Claims, 1 Drawing Sheet

COMPOSITION FOR CONSTRUCTION MATERIAL AND ITS METHOD OF MAKING AND USING THE SAME

FIELD OF THE INVENTION

The present invention generally relates to construction material. Specifically, the present invention relates to a composition and process for converting fabric into construction material. More specifically, the present invention relates to a construction material composition comprised of fabric.

Documents cited in the following text, and all documents cited or referenced in the documents cited in the following text, are incorporated herein by reference. Documents incorporated by reference into this text or any teachings therein may be used in the practice of this invention. Documents incorporated by reference into this text are not admitted to be prior art. Furthermore, authors or inventors on documents incorporated by reference into this text are not to be considered to be "another" or "others" as to the present inventive entity and vice versa, especially where one or more authors or inventors on documents incorporated by reference into this text are an inventor or inventors named in the present inventive entity.

BACKGROUND OF THE INVENTION

Waste carpet poses serious problems for municipalities worldwide. The disposal of waste carpets, for example, carpets used in residences or commercial properties for many years and which are then removed and replaced with new carpeting due to wear or renovation, represents a problem of increasing environmental significance. As carpets are normally not biodegradable, some typical ways of disposing such used carpets include filling and stacking in waste dumps, which takes up large tracts of land and pollutes underground water; and burning, which seriously pollutes the atmosphere.

A third way of disposing used carpets, however, is converting the used carpets into another, useful material. In the patent literature, there are various methods of forming composite materials with carpet waste. For example, U.S. Pat. No. 5,217,655 relates to a process for preparing a composite product from an intake material incorporating commercial, municipal or industrial waste containing organic, plastic and fibrous material includes first granulating and sizing the material. The material is then heated in three consecutive phases, first at a temperature sufficient to achieve an internal temperature within the material of about 215° to 250° F., then at a temperature sufficient to achieve an internal temperature within the material of about 250° to 320° F. and then at a temperature sufficient to achieve an internal temperature within the material of about 320° to 400° F, wherein said material is continuously mixed during said heat phases. The material may then be co-extruded with a reinforcement structure and forced into vacuum profile dies to form a product or compression molded to form a product and cooled.

U.S. Pat. No. 5,294,384 relates to a process for forming a thermoplastic composition from carpet wherein a carpet sample is melt blended without separating the carpet into its component parts. The process produces a thermoplastic composition useful as a substitute for virgin thermoplastics in a variety of thermoplastic resin applications.

U.S. Pat. No. 5,626,939 relates to a composition and a process for the preparation thereof for a fibrous composite (e.g., synthetic wood). The fibrous composite contains 50 to 95% by weight carpet and 5 to 50% by weight of a structural adhesive. Structural adhesives effective in this application include phenol-formaldehyde resins, either of the resole or novalac type, phenol-formaldehyde resins that have at least one other co-monomer present, e.g., bis-phenol A, resorcinol, and other substituted phenols, urea-formaldehyde resins, melamine urea formaldehyde resins, tannin-phenol-formaldehyde resins, diisocyanate resin, epoxy resins, crosslinkable polyvinyl acetate, proteins, e.g., soy flour, blood and polyester resins. The process for the formation of the fibrous composite would include shredding the carpet without component separation thereof to form carpet fibers, coating a resin on the carpet fibers to form resin coated fibers, curing the resin coated fibers under a pressure and a temperature sufficient to cure the resin and form a fibrous composite, and cooling the composite. The carpet is shredded to produce fibers of from ⅛ to ¾ of an inch. In one aspect of the invention, fabric, either natural or synthetic is added to the shredded carpet.

U.S. Pat. No. 5,662,994 relates to carpet material with at least a proportion of uncleaned used carpets shredded to form a fiber-like wooly mass. The carpet material contains a thermoplastic binder with a low melting point, for example polypropylene, which can be derived from the used carpets or be added. On at least one side of the carpet material, a cover layer of wood chips is provided. The carpet material, together with the layers of the adhesive-coated wood chips which form the cover layers, is compressed to form the molded part or panel, at a temperature which lies above the plasticizing point of the thermoplastic binder, but below the plasticizing point of any other thermoplastic components of the carpet material.

U.S. Pat. No. 5,719,198 relates to a polymeric blend from recycled carpet scrap and selected compatibilizing agents and/or poly(ethylene-co-omylacetate) and the products produced from such a blend.

U.S. Pat. No. 5,724,783 relates to a wall building panel apparatus which includes a plurality of elongated panel frame members attached together to form a panel framework and having at least one stud attached between two panel frame members and having a panel side covering at least one side of the framework. A waste recycle aggregate material in a portland cement panel layer is formed in the panel to provide a prefabricated panel using waste recycle materials. A plurality of aggregate material and cement panel layers may be formed using recycled materials including used fiberglass insulation, recycled polystyrene, rubber tires, and old carpet material. The waste materials are converted to an aggregate through chopping, shredding, or with a hammer mill. A wall building process includes selecting waste recycling materials, such as used fiberglass insulation, used rubber tires, waste polystyrene, or waste carpet materials and converting the selected waste recycling materials into an aggregate material by chopping, shredding, or with a hammer mill. The aggregate is dampened and coated with a coating mixture which includes portland cement and microsilica. The coated aggregate recycling material is mixed with additional cement and sand and further mixed with additional cement and water and then placed into a building wall unit. The process includes placing the mixture in a plurality of layers with a wall panel, each layer including a different recycled material or combination of materials.

U.S. Pat. No. 5,786,279 relates to carpet material with at least a proportion of uncleaned used carpets shredded to form a fiber-like wooly mass. The carpet material contains a thermoplastic binder with a low melting point, for example polypropylene, which can be derived from the used carpets or be added. Furthermore, a proportion of fiber-like wood chips is added to the carpet material. The total mass is compressed to form the molded part or panel, at a temperature which lies above the plasticizing point of the thermoplastic binder, but below the plasticizing point of any other thermoplastic components of the carpet material.

U.S. Pat. No. 5,786,280 relates to carpet material with at least a proportion of uncleaned used carpets shredded to form a fiber-like wooly mass. The carpet material contains a thermoplastic binder with a low melting point, for example polypropylene, which can be derived from the used carpets or be added. Furthermore, a duroplastically hardening binder, for example phenolic resin, is added to the carpet material. The carpet material is compressed to form the molded part or panel with these two binders, at a temperature which lies above the plasticizing point of the thermoplastic binder, but below the plasticizing point of any other thermoplastic components of the carpet material.

U.S. Pat. No. 5,853,634 relates to a building material and a method for its manufacture wherein cellulosic, polymeric and acid wastes are treated and combined to produce a building panel which demonstrates low weight, high strength and fire resistance.

U.S. Pat. No. 5,912,062 relates to compositions and processes wherein recycling of waste carpets and textiles is performed by coating the individual yarn fibers with a low viscosity adhesive that is dispersed or dissolved in a suitable solvent to affect coverage of the fine fibers, and arranging the coated fibers in layers to affect the most desirable physical properties and then curing to provide a high modulus matrix for the coated fibers in the laminate structure. The fibers may be from unshredded or shredded waste carpets, shredded waste woven or non woven fabrics, fabric bits, and knitted fabrics. When the carpet is used in an "as received" condition, the face yarns, which may contain one or more components yarns, are coated and the carpets are arranged in a sandwich construction wherein the backings of the two carpets are placed back-to-back, e.g., (F–B–(B–F)$_n$–B–F, (n=0 or an integer value, F=face yarn and B=backing) and then heated under applied pressure to affect a cure of the resin coating and the adhesion between carpet backing layers. The resulting laminate consists of two outer fibrous layers that contains the unmelted yarns bundles from the carpet in a high modulus matrix.

U.S. Pat. No. 6,211,275 relates to a wood substitute composition that utilizes in its production heretofore unused waste material produced in the reclamation of nylon from discarded carpet, along with processes for produced the wood substitute composition. The wood substitute composition shares similar properties to wood, and hence has applications in the building and construction industries.

German Patent DE 4014012 relates to the production of a composite construction material containing variable amounts of polyamide fiber waste by (i) dissolving the waste fibers in acid; (ii) adding fibers to thicken the solution and/or neutralizing the solution with a base; (iii) hardening the composition by adding water as a catalyst, the water being obtained from the neutralization or from the dilution of the acid or being added after forming the composition; (iv) using salts from the neutralization and minerals to effect solidification and act as flame proofing agents; (v) modifying the composition with acid-resistant fibers, granulates, powders and pigments; and (vi) treating the composition in a plant having a mixing device, low pressure chamber and air-cleaning device.

Such processes in the patent literature for converting waste carpet into another material, however, pose other problems. For example, such processes require corrosive reactants; involve complex steps and machinery; and require elevated reaction temperatures and pressures. It would be desirable to utilize a composition for converting fabric into construction material that is non-toxic, odorless and non-corrosive. Further, it would be desirable to form construction material, such as, for example, pavement, roadway and sea reclamation bricks from fabric, wherein the construction material is fast-hardening, very pure, hard, solid, non-toxic, weather-resistant, and resistant to acidic and alkaline substances. It would also be advantageous to manufacture such a construction material from fabric, preferably carpet, that hardens at normal atmospheric conditions and temperatures, is cost-effective to produce and requires minimal process steps and conditions. Finally, it would be desirable to no longer dispose of waste carpets by filling, stacking and burning the waste carpets, thereby lessening the environmental impact of such pollution-generating waste treatment processes.

SUMMARY AND OBJECTS OF THE INVENTION

In accordance with the present invention, a composition for converting fabric into construction material is provided, comprising a powder comprising a Group II oxide, a Group III oxide and a transition metal oxide, and an aqueous compound, wherein the powder and the aqueous compound are present in an amount sufficient to produce a flowable composition capable of being molded and hardened.

Further and in accordance with the present invention, a construction material is provided comprising a powder comprising a Group II oxide, a Group III oxide and a transition metal oxide, an aqueous compound and fabric. In a preferred embodiment, the construction material further comprises a Group V oxide Also in accordance with the present invention, a process is provided for converting fabric into a construction material, comprising the steps of mixing fabric with a powder comprising a Group II oxide, a Group III oxide and a transition metal oxide to form a first mixture, adding an aqueous compound to said first mixture to form a second mixture, pouring said second mixture into a mixer and mixing for about 3 to about 30 minutes, pouring said mixed second mixture into a mold, extrusion molding said second mixture into a composite material, demolding said composite material, and allowing said composite material to harden.

An object of the present invention is to convert fabric into construction material in a safe, inexpensive and environmentally-friendly manner. A further object of the present invention is to utilize a composition and process for converting fabric into construction material wherein the construction material is flowable, able to be molded into many different shapes and configurations, and able to harden.

In this disclosure, "comprises", "comprising" and the like can have the meaning ascribed to them in U.S. Patent Law and can mean, "includes", "including" and the like.

These and other embodiments are disclosed or are obvious from and encompassed by the following detailed description.

BRIEF DESCRIPTION OF THE DRAWINGS

In the following detailed description, reference will be made to the accompanying drawings, wherein.

DETAILED DESCRIPTION

Figure 1:
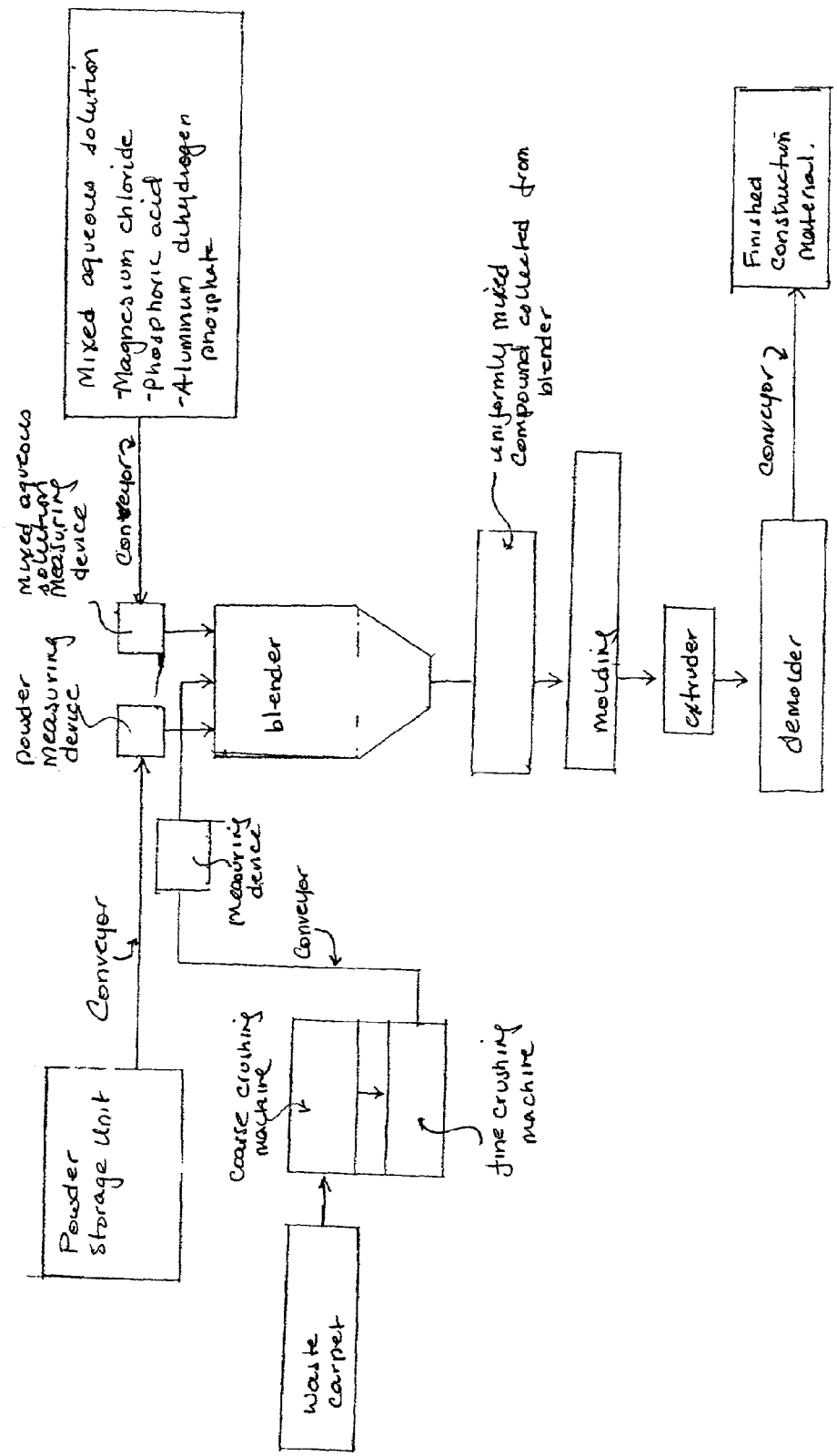
FIG. 1 is a flow chart representing one embodiment of the process of the instant invention.

The present invention provides, inter alia, a composition for converting fabric into construction material, comprising a) a powder comprising a Group II oxide, a Group III oxide and a transition metal oxide, and b) an aqueous compound, wherein the powder and the aqueous compound are present in an amount sufficient to produce a flowable fabric composition capable of being molded and hardened. The present invention also provides a construction material, comprising a powder comprising a Group II oxide, a Group III oxide and a transition metal oxide, an aqueous compound, and fabric. In a preferred embodiment, the construction material further comprises a Group V oxide Fabric is obtained, for example, from clothing, carpets, textiles, linens, furniture, apparel, and bedding. Preferably, the fabric is carpeting. Most preferably, the fabric is used or waste carpeting, such as carpeting used in residences or commercial properties and then removed and replaced with new carpeting due to wear or renovation. Fabric is also obtained from the left-over scraps of fabric during manufacturing of the fabric, such as in the textile industry, or directly from fabric manufacturers or retailers. A skilled artisan would readily understand, however, other sources of fabric. The fabric is most preferably a postconsumer, or used, fabric.

An advantageous result in connection with the invention, which would not have been expected by one skilled in the art, is that a high proportion of foreign substances in the fabrics is recycled. Thus, in a preferred embodiment and using the method according to the invention, it is possible to process fabrics, such as used carpeting, in the condition in which they were delivered, and to produce construction material according to the invention from them without complicated cleaning and separation processes.

The process of the present invention may also be used for converting other fabric samples into a useful construction material. For example, the sample may be a fabric sample which was originally manufactured with some type of defect and is therefore unacceptable for sale. Also, the fabric sample may be a fabric returned to the manufacturer by the purchaser as an unacceptable product.

The general composition of fabric according to the present invention is, but is not limited to, natural materials, synthetic materials or combinations of both natural and synthetic materials. Examples of natural fabric include, without limitation, fabrics comprised of wool or cotton. Examples of synthetic fabric include, without limitation, fabrics comprising nylon, rayon, amides, polyamides, polyurethanes, resins, epoxies, polyolefines, other polymers, polymeric blends or combinations thereof. Further, the fabric may be made from, but not limited to, fibers and/or filaments. Further, the general composition of the fabric according to the present invention may be more than one natural material, more than one synthetic material or combinations of more than one natural and more than one synthetic materials. Still further, the fabric may be, for example, woven, non-woven or knitted and manufactured by any known process in the art such as, for example, extruding, molding, blending, spinning, weaving or air-entangling. The amount of fabric used by the present invention is in an amount of from about 80 to about 120 percent by weight relative to the total weight of the powder and aqueous solution combined.

The powder comprising a Group II oxide, a Group III oxide and a transition metal oxide according to the present invention is, but is not limited to, a composition comprising from about 80 to about 90% by weight magnesium oxide, from about 1 to about 2% iron oxide by weight, from about 1 to about 10% by weight calcium oxide and from about 0.5 to about 1% by weight of phosphorous oxide. The amount of powder used by the present invention is in an amount of from about 100 to about 130 parts by weight of the total weight of the composition. In a preferred embodiment, the powder further comprises a Group V oxide The powder comprising a Group II oxide, a Group III oxide, and a transition metal oxide, and preferably further a Group V oxide, may also comprise additives or other reagents. Such additives or other reagents include, but are not limited to, titanium oxide, potassium oxide, manganese oxide and silicon dioxide. A skilled artisan, however, would readily understand that other components may be added to the powder to achieve any desired properties.

Concentrations of these additives or reagents according to the present invention are, but are not limited to, from about 0.01 to about 0.5% titanium oxide by weight, from about 0.1 to about 0.5% by weight potassium oxide, from about 0.04 to about 0.1% by weight manganese oxide and from about 0.1 to about 0.5% silicon oxide.

The amount of aqueous compound utilized according to the present invention is from about 45 to about 80 percent by weight relative to the weight of the powder. The aqueous compound according to the present invention is, but is not limited to, a solution comprising magnesium chloride, phosphoric acid and aluminum dihydrogen phosphate. The concentration of these components include, but are not limited to, from about 40 to about 60% by weight magnesium chloride, from about 0.4 to about 0.8% by weight phosphoric acid, from about 0.2 to about 0.6% by weight aluminum dihydrogen phosphate and from about 38.6 to about 59.4% water.

Optionally, additional components may be added to the composition for converting fabric into construction material in accordance with the present invention. The components include, but are not limited to, fibers, color pigments, polymers, and chemical or mineral mixtures added in an art recognized amount to the composition. Such components may be used to impart, for example, durability, environmental resistance, heat resistance and aesthetic properties to the construction material.

Short fibers are optionally added as a reinforcing material to enhance the flexural and impact resistance of the construction material. Suitable fibers include, but not limited to, various natural and synthetic mineral fibers, such as carbon fibers, fiberglass, steel fibers, alkali-resistant glass fibers, basalt fibers, and natural and synthetic organic fibers, such as propylene, vinylone, and cellulose fibers.

In order to provide an aesthetically pleasing construction material, color pigments are used. Suitable pigments include, but are not limited to, iron oxide, natural burnt amber, carbon black, chromium oxide, titanium dioxide, and the like.

The present invention further provides a process for converting fabric into a construction material comprising the steps of a) mixing fabric with a powder comprising a Group II oxide, a Group III oxide and a transition metal oxide to form a first mixture, b) adding an aqueous compound to said first mixture to form a second mixture, c) pouring said second mixture into a mixer and mixing for about 3 to about 30 minutes; d) pouring said mixed second mixture into a mold, e) extrusion molding said second mixture into a composite material; f) demolding said composite material, and g) allowing said composite material to harden. In a preferred embodiment, the composite material is allowed to harden at room temperature. In another preferred embodiment, the second mixture is mixed for about 3 to about 10 minutes. However, a skilled artisan would understand that other mixing times may be appropriate in order to form a homogenous mixture. In a preferred embodiment, the powder further comprises a Group V oxide.

In another preferred embodiment, the fabric is first shredded, by any known process in the art, prior to mixing with the magnesium aluminum powder. A skilled artisan would readily understand, however, that any other means for reducing the fabric to smaller size may also be used, such as choppers, grinders, granulators, pulverizers and the like. Preferably, the size of the shredded carpet depends on the size of the construction material end product. Thus, for example, if a smaller construction material is desired, the dimensions of the carpet would be about 5 mm×5 mm×5 mm. If a larger construction material is desired, the dimensions of the scrap carpet can be sized accordingly. Preferably, the carpet is shredded to a dimension of less than or equal to about 30 mm×30 mm×30 mm, more preferably less than or equal to 8 mm×8 mm×8 mm, most preferably less than or equal to about 5 mm×5 mm×5 mm.

The extrusion molding process can be any process known in the art. For example, double-extruding and multi-piece extruding can be used. Further, compression molding can be used. Further still, the composite material can be hardened at ambient atmospheric and temperature conditions and/or at temperatures for a time sufficient for the composite material to harden the time necessary to achieve sufficient hardening can be greatly shortened by means of steam curing at elevated temperatures, a method known to the precast industry.

The inventive construction material can be formed in different shapes suitable for various architectural, decorative, structural and engineering applications. Such applications include, without limitation, pavement, roadway and sea reclamation applications. Further, the invention construction material can be used to fill in spaces, such as filling in deserted tunnels and mines.

The invention shall be further described by way of the following non-limiting examples that are also an illustration of the invention and are not to be considered a limitation of this invention, many apparent variations of which are possible without departing from the spirit or scope thereof.

EXAMPLES

Example 1

Composition for Converting Fabric into Construction Material

A composition for converting fabric into construction material is formed according to Table 1.

TABLE 1

| Composition of Powder[1] (By Weight) | Composition of Aqueous Compound (By Weight) |
| --- | --- |
| 80–90% magnesium oxide | 40–60% magnesium chloride |
| 1–2% iron oxide | 0.4–0.8% phosphoric acid |
| 1–10% calcium oxide | 0.2–0.6% aluminum dihydrogen phosphate |
| 0.5–1.0% phosphorous oxide | 38.6–59.4% water |
| Group III oxide | |

[1]Optional components include, by weight: 0.01–0.5% titanium oxide, 0.1–0.5% potassium oxide, 0.04–0.1% manganese oxide and 0.1–0.5% silicon oxide.

Example 2

Fabric Construction Material

A fabric construction material is formed according to Table 2.

TABLE 2

| COMPONENT | AMOUNT |
| --- | --- |
| Powder comprising a Group II oxide, a Group III oxide and a transition metal oxide | 100–130 parts |
| Aqueous compound | 45–80 parts |
| fabric | 80–120 parts |

Example 3

Types of Construction Products Produced

A construction material in the form of a brick is formed according to Table 3.

TABLE 3

| Powder | Aqueous Compound | Fabric | Construction Material Produced |
| --- | --- | --- | --- |
| 100 Parts | 50 Parts | 100 Parts | Pavement Brick |
| 120 Parts | 55 Parts | 90 Parts | Roadway Brick |
| 130 Parts | 60 Parts | 80 Parts | Sea Reclamation Brick |

Example 4

Method of Making Construction Material

The powder comprising a Group II oxide, a Group III oxide and a transition metal oxide, and the aqueous compound was prepared according to the composition described in Table 1 of Example 1. The fabric was added to the powder to form a first mixture. The aqueous compound was added to the first mixture, thereby forming a second mixture. The second mixture was poured into a mixer and mixed for about 3 to about 30 minutes. The second mixture was placed into a mold and extrusion molded into a composite material. The composite material was demolded and allowed to harden in an ambient environment. FIG. 1 represents a flow chart of one embodiment of the process of the invention.

The hardened product exhibited a solid surface, was non-toxic, weather-resistant, and resistant to acidic and alkaline substances. The hardened product also exhibited, for example, the following properties:

| | |
| --- | --- |
| Strength Resistance | ≧ approximately 30 Mpa. |
| Tensile Strength | ≧ approximately 3.5 Mpa. |
| Acid Resistance | Approximately pH 3. |
| Resistance to Salt Solutions | Up to Approximately 0.3% NaCl solution tested by the People's Republic of China's Standard 540595–144595. |

Example 5

Testing of Physical Properties of Hardened Construction Material

The construction material in the form of road bricks made according to the invention were tested using People's Republic of China's test standard JC/T 446-2000. The following results indicate that the test values fell within the standard index for a quality product:

| Test Items | | Standard Index (Quality Product) | Test Value |
|---|---|---|---|
| Water absorption, % | | ≦8.0 | 7.2 |
| Resistance to Compression, Mpa | | Average value ≧ 30.00 ([Ce]30) | 43.3 |
| | | Single Piece Minimum Value ≧ 25.0 ([Ce]30) | 40.9 |
| Resistance to Folding, Mpa | | Average value ≧ 3.50 (Cr3.5) | 4.71 |
| | | Single Piece Minimum Value ≧ 3.00 (Cr3.5) | 3.12 |
| Resistance to Freezing | Quality by Appearance | On the surface of the test item, there is no flaking, stratification, cracking and extension of cracking | On the surface of the test item, there is no flaking, stratification, cracking and extension of cracking |
| | Strength Loss, % | ≦20.0 | Strength loss for resistance to compression 10.95% |
| Abrasive Resistance | | Abrasion Groove Length ≦35.0 mm | 32.6 mm |

Example 6

Toxicity Tests of Hardened Construction Material

The hardened construction material according to the instant invention was also tested for leaching toxicity under the People's Republic of China's test standard GB5085.3-1996, "Water and Waste Water Monitor and Analysis Procedure". The following results indicate that the construction material is non-toxic:

| Test Number | Item | Result (mg/L) | Maximum Allowed Limit (mg/L) |
|---|---|---|---|
| 1 | As | N.D. | 1.5 |
| 2 | Ba | 0.66 | 100 |
| 3 | Be | N.D. | 0.1 |
| 4 | Cd | N.D. | 0.3 |
| 5 | Cr | 0.66 | 10.0 |
| 6 | Cu | N.D. | 50.0 |
| 7 | Hg | N.D. | 0.05 |
| 8 | Ni | 0.13 | 10.0 |
| 9 | Pb | N.D. | 3.0 |
| 10 | Zn | N.D. | 50.0 |
| 11 | CN | 0.138 | 1.0 |
| 12 | Fluoride | 0.08 | Within Limits. |
| 13 | Hexavalent chrome | 0.052 | Within Limits. |

Various modifications and variations of the described compositions, materials and methods of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the art or in related fields are intended to be within the scope of the following claims.

What is claimed is:

1. A composition for converting fabric into construction material, comprising
    a) a powder comprising a Group II oxide, a Group III oxide and a transition metal oxide; and
    b) an aqueous compound comprising magnesium chloride,
    wherein the powder and the aqueous compound are present in an amount sufficient to produce a flowable fabric composition capable of being molded and hardened.

2. The composition of claim 1, further comprising a Group V oxide.

3. The composition of claim 1, wherein the powder comprises magnesium oxide, iron oxide, calcium oxide, and phosphorous oxide.

4. The composition of claim 1, wherein the powder comprises from about 80 to about 90% magnesium oxide by weight, from about 1 to about 2% iron oxide by weight, from about 1 to about 10% calcium oxide by weight, and from about 0.5 to about 1% phosphorous oxide by weight.

5. The composition of claim 1, wherein the powder is in an amount of from about 55.5% to about 74.3% by weight of the total composition.

6. The composition of claim 1, wherein the aqueous compound is present in an amount of from about 25.7% to about 44.4% by weight of the total composition.

7. A composition for converting fabric into construction material, comprising
    a) a powder comprising a Group II oxide, a Group III oxide and a transition metal oxide, wherein the powder further comprises from about 0.01 to about 0.5% titanium oxide by weight, from about 0.1 to about 0.5% potassium oxide by weight, from about 0.04 to about 0.1% manganese oxide by weight and from about 0.1 to about 0.5% silicon oxide by weight; and,
    b) an aqueous compound comprising magnesium chloride and phosphoric acid;
    wherein the powder and the aqueous compound are present in an amount sufficient to produce a flowable fabric composition capable of being molded and hardened.

8. A composition for converting fabric into construction material, comprising
    a) a powder comprising a Group II oxide, a Group III oxide and a transition metal oxide; and
    b) an aqueous compound, wherein the aqueous compound comprises magnesium chloride, phosphoric acid, and aluminum dihydrogen phosphate;
    wherein the powder and the aqueous compound are present in an amount sufficient to produce a flowable fabric composition capable of being molded and hardened.

9. A composition for converting fabric into construction material, comprising
  a) a powder comprising a Group II oxide, a Group III oxide and a transition metal oxide; and,
  b) an aqueous compound, wherein the aqueous compound comprises from about 40 to about 60% magnesium chloride by weight, from about 0.4 to about 0.8% phosphoric acid by weight, from about 0.2 to about 0.6% aluminum dihydrogen phosphate by weight, and from about 38.6 to about 59.4% water by weight;
  wherein the powder and the aqueous compound are present in an amount sufficient to produce a flowable fabric composition capable of being molded and hardened.

* * * * *